United States Patent [19]

Bindin

[11] 4,376,809
[45] Mar. 15, 1983

[54] SODIUM SULPHUR BATTERIES AND CELL MODULES THEREFOR

[75] Inventor: Peter J. Bindin, Runcorn, England

[73] Assignee: Chloride Silent Power Limited, London, England

[21] Appl. No.: 283,310

[22] Filed: Jul. 14, 1981

[30] Foreign Application Priority Data

Nov. 6, 1980 [GB] United Kingdom ............... 8035725

[51] Int. Cl.³ ............................................ H01M 10/50
[52] U.S. Cl. ..................................... 429/62; 429/104; 429/71
[58] Field of Search .................... 429/62, 104, 120, 71; 236/1 C, 1 E, 1 B, 35.2, 47, 91 D, 99 F

[56] References Cited

U.S. PATENT DOCUMENTS

| | | | |
|---|---|---|---|
| 3,413,150 | 11/1968 | Kummer et al. | 429/62 |
| 3,758,337 | 9/1973 | Fally et al. | 429/62 |
| 3,837,918 | 9/1974 | Nakabayashi | 429/62 |

FOREIGN PATENT DOCUMENTS 52-58822  5/1977  Japan ................................. 429/104

Primary Examiner—Donald L. Walton
Attorney, Agent, or Firm—Beveridge, DeGrandi and Kline

[57] ABSTRACT

A sodium sulphur battery formed of a plurality of modules each containing a cell or cells has a passage through each module for a heating and/or cooling fluid and thermostatically controlled valve means for controlling the flow of fluid through this passage which valve means is open at temperatures above a predetermined temperature, e.g. 370° C. for passage of a coolant fluid and is also open at temperatures below another predetermined temperature, e.g. 300° C. for passage of a heating fluid. The valve is preferably gradually closed and opened between these tempteratures. Each valve is controlled in accordance with the temperature of the associated module.

16 Claims, 4 Drawing Figures

SODIUM SULPHUR BATTERIES AND CELL MODULES THEREFOR

BACKGROUND OF THE INVENTION

This invention relates to sodium sulphur batteries comprising a plurality of modules, each module containing one or more sodium sulphur cells. The invention also relates to such modules.

A sodium sulphur cell operates at a temperature at which the anodic reactant (sodium) and the cathodic reactant (sulphur/sodium polysulphides) are both liquid. Typically the operating temperature is 350° C. Provision therefore has to be made to heat the cells to bring them up to the operating temperature. A sodium sulphur cell however is capable of a high current output and, in normal operation, the heat generated internally in the cells by the current therethrough is more than sufficient to maintain the required temperature. In general the cells in a battery are thermally insulated so that the cells remain at the operating temperature during intervals when current is not being drawn.

When a large number of cells are assembled close together to form a battery, then there is a possibility of overheating occurring during normal operation and provision has to be made for cooling the cells.

SUMMARY OF THE INVENTION

It is an object of the present invention to provide a simple and convenient means for temperature control in a sodium sulphur battery.

According to one aspect of the present invention, a module for a sodium sulphur battery comprises one or more sodium sulphur cells, the module forming or containing a flow passage for a heat transfer fluid and having a flow control valve in the flow passage controlled by temperature-responsive means operative to close the flow control valve to prevent or reduce flow of fluid through said passage over a predetermined temperature range. The flow control valve can be constructed to be open at temperatures both above and below said predetermined temperature range.

According to another aspect of the present invention, a sodium sulphur battery comprises a plurality of modules, each module containing one or more sodium sulphur cells of elongate form and each module forming or containing a flow passage for a heat transfer fluid, each module furthermore having a flow control valve in the flow passage controlled by temperature-responsive means operative to close the flow control valve and thereby to prevent or reduce flow of the heat transfer fluid through the module over a predetermined temperature range within which the cell is operative, the flow control valve being open at temperatures above and below said predetermined temperature range and means for passing said heat transfer fluid to said modules to flow therethrough when the respective valves are open.

With the above-described construction the heat transfer fluid, which would typically be air, is passed through the modules when they are above or below the predetermined temperature range which is a range within which the cells are operative. In normal operation, when heat has to be removed from the cells, the fluid, e.g. atmospheric air, may be through the modules to remove the heat. If cells have to be heated, e.g. if the battery has to be started from cold, the air or other heat transfer fluid is heated before it is passed through the modules. In some cases heating means may be provided in the battery but often it may be convenient to provide a portable auxiliary air heater for feeding hot air into a battery which is to be brought up to operating temperature.

The flow control valve conveniently comprises an apertured element and a closure element, e.g. a plate, which are relatively movable under the control of said temperature-responsive means. These temperature-responsive means may be a bimetallic strip. By choice of the shaping of the closure element and the aperture or apertures in said apertured element, it can readily be arranged that the aperture or apertures is or are fully closed over a predetermined temperature range. Outside that range, the or each aperture is at least partially open. The rate of aperture opening is determined by the shaping of the aperture and closure member.

In a convenient arrangement a bimetallic strip, conveniently of helical form, is arranged to effect rotational movement between a closure member and an apertured plate. The plate may have more than one aperture and the closure member may be shaped to pass across the various apertures simultaneously as the temperature changes.

In a convenient form of construction, each module comprises a plurality, e.g. four, elongate cells arranged around a straight flow passage. The flow passage may be defined by the cell walls or may be formed by a metal tube in thermal contact with the cells. The flow control means is conveniently arranged at one end of the module. Preferably the flow control means is operated mechanically directly by a thermally responsive element, such as a bimetallic strip, so that there is no need for any electrical control system in each module. The individual modules conveniently are of square or rectangular cross-section so that they may be stacked together in an assembly to form a battery. The fluid driving means may comprise an air blower feeding air into a header or headers for passage through the various modules. The header or headers may be arranged at one end of the modules and the individual modules may be removably mounted in the battery so that they can be drawn out at the other end for replacement if necessary. The heating means may comprise an electrically energised air heater for heating the air passing through or in said header or headers. In this case, a temperature-responsive switch, responsive to the temperature of the battery may be provided for controlling the heater. It will be appreciated that, provided each cell in the battery is raised to a temperature at which it will start operating, when current is drawn from the cell, that cell will generate further heat internally and hence all the cells will become heated to the required operating temperature. For this reason, the temperature control for the heater is not critical. The simple form of flow control valve serves to interrupt or at least reduce flow of the fluid through the module when the cells are at their normal operating temperature but, as is well known, this temperature can vary between relatively wide limits. The simple arrangement described above however enables cells to be heated without providing each cell or module with an individual electric heating element. It also ensures that a coolant is passed through the modules if they become too hot.

DESCRIPTION OF THE PREFERRED EMBODIMENT

Figure 1:
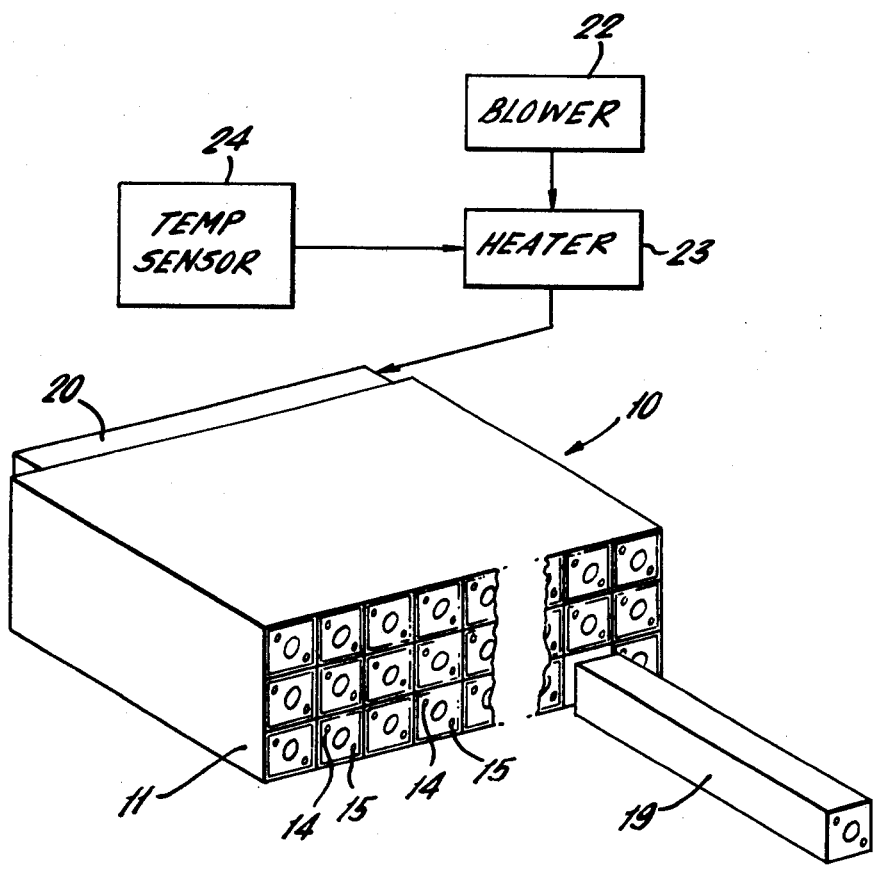
FIG. 1 is a perspective view of a battery containing a plurality of modules each with four sodium sulphur cells.

Referring to FIG. 1 there is shown diagrammatically a battery 10 comprising a supporting frame 11 adapted to hold a plurality of modules 12 arranged in rows and columns. In this particular embodiment, the modules are elongate modules extending horizontally. Each module has two electrical terminals 14, 15 at its front end for electrical interconnection of the modules. For simplicity these electrical connections have been omitted. In the known way the modules may be connected in series and/or parallel. The modules may be withdrawn from the front end of the assembly as shown with one module 19, so enabling the modules to be removed and replaced. At the rear end of the modules, they are mechanically arranged so that air from a header 20, extending across the rear surface of the battery, can pass into a passageway through each respective module. Air is passed into the header by means of a blower shown diagrammatically at 22. In this particular battery, electrical heater means 23 are provided for heating air passing from the blower into the header, these heating means being controlled by temperature-responsive means shown diagrammatically at 24 which are responsive to the temperature of the battery. These temperature-responsive means may comprise a temperature sensor or preferably a plurality of sensors embedded in the battery structure. If there are a plurality of sensors, averaging means may be provided for controlling the heating means. These temperature responsive means may be arranged to switch off the heater if the temperature sensed at the measuring point or points exceeds a preselected temperature which typically is about 300° C.

In many circumstances, it is more convenient however to make use of a portable air heater which can be connected to the header when it is required to heat a battery from cold. Such an arrangement may be used for example with a battery or a vehicle. Heating of the battery is effected using a portable heater, before the vehicle starts a journey. During normal operation of the vehicle, the battery will remain at a suitable operating temperature even when no current is being drawn from the battery.

Figure 2:
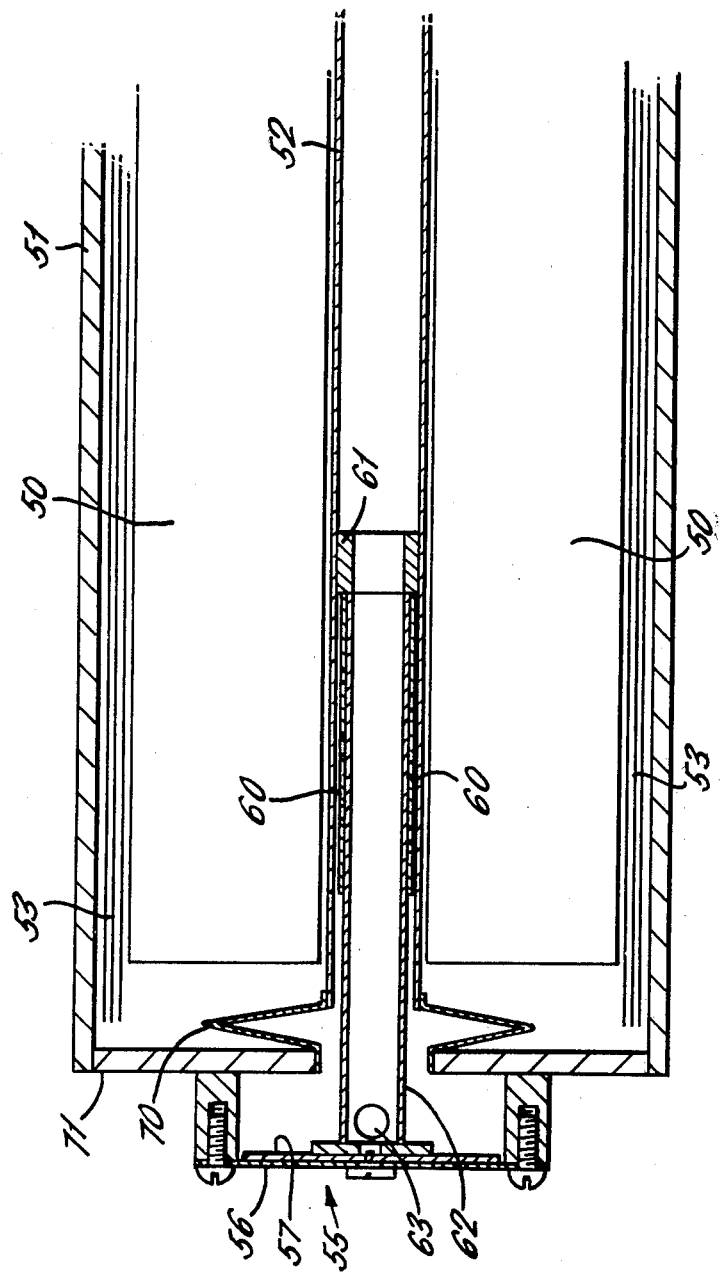
FIG. 2 is a sectional side elevation of part of one module in the battery of FIG. 1.
Figure 3:
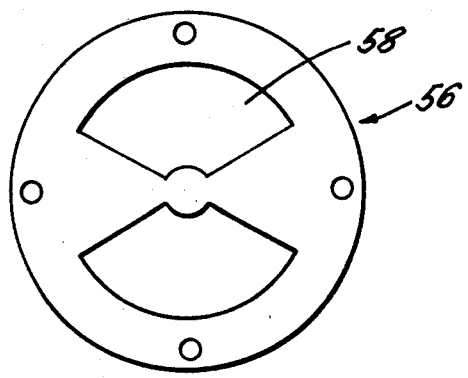
FIGS. 3 and 4 are front elevations of two components of a flow control valve.
Figure 4:
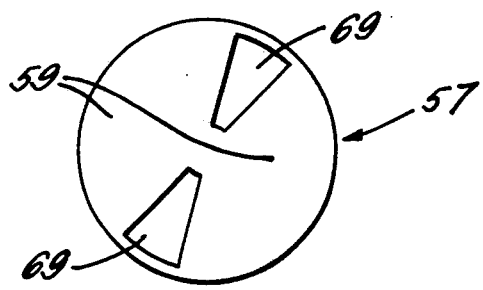

Referring to FIG. 2, each module comprises four cells 50 arranged in an outer metal casing 51 of square section. Extending centrally through the module is a pipe 52 for the heat transfer fluid which in this case is air. This pipe is in thermal contact with all four cells and is sealed by bellows units 70 to end plates 71 of the module. Around the outside of the cells, between the cells 50 and the outer container 51, insulation is provided shown diagrammatically at 53. The pipe, at one end, has a flow control valve 55 which comprises two relatively rotatable components 56, 57 shown in front elevation in FIGS. 3 and 4 respectively. The component 56 of this valve is a fixed plate having, in the embodiment shown, two apertures 58. The fixed plate 56 is bolted to one end plate 71 of the module. The second component 57 is a shutter rotatably mounted on the plate 56; this shutter has two closure portions 59 which move simultaneously across the apertures 58 as the shutter is rotated. The shutter is driven by a helical bimetallic element 60, one end of which is welded to a fixed tube 61 lying within the pipe 52 in the module and the other end of which is welded to a coaxial but rotatable tube 62 extending through the end of the pipe 52 and through the end plate 71 to the shutter 57, which is welded to the tube 62. The bimetallic element 60 is arranged so that the shutter 57 closes the apertures 58 over a predetermined temperature range, e.g. 300° C. to 370° C. In this temperature range, the cells will operate normally and require neither heating nor cooling. If the cells become too hot, the bimetallic strip drives the shutter further round so that cut outs 69 in the plate 57 overlap the apertures 58 in plate 56, thereby gradually opening the apertures. Air from the aforementioned blower passes via the header and through the valve apertures 58 into the module hence serving to cool the cells therein. The pipe 62 has apertures 63 so that the air passing through apertures 58 can enter the tube 62 and hence can flow along this tube and so through tube 61 and pipe 52. If the cells are cold, the shutters move to an opposite extreme position, leaving the air passage open for the passage of hot air through the module.

It will be seen that the above-described construction permits of individual modules being readily moved. There are no separate control connections for the temperature control or heating the individual modules yet each module is cooled only if its temperature rises above the predetermined range set by the operation of the valve.

I claim:

1. A module for a sodium sulphur battery comprising a container having at least one sodium sulphur cell, a flow passage for a heat transfer fluid through the container, a flow control valve in the flow passage, and temperature-responsive means arranged to control said valve in accordance with temperature and operative to close the flow control valve to prevent or reduce flow of fluid through said passage over a predetermined temperature range and to open said flow control valve at temperatures both above and below said predetermined temperature range.

2. A module as claimed in claim 1 wherein said flow control valve comprises an apertured element and a closure element which are relatively movable under the control of said temperature-responsive means, whereby at least one aperature in said apertured element is at least partially closed by the closure element within said predetermined temperature range and is open both above and below said predetermined temperature range.

3. A module as claimed in claim 2 wherein said apertured element and closure element are relatively rotatable.

4. A module as claimed in claim 1 wherein said temperature-responsive means is a bimetallic strip.

5. A sodium sulphur battery comprising a plurality of modules, each module comprising a container having at least one sodium sulphur cell of elongate form, a flow passage for a heat transfer fluid through the container, a flow control valve in the flow passage controlled by temperature-responsive means operative to close the flow control valve and thereby to prevent or reduce flow of the heat transfer fluid through the module over a predetermined temperature range within which the cell is operative, the flow control valve being open at temperatures above and below said predetermined temperature range and means for passing said heat transfer fluid to said modules to flow therethrough when the respective valves are open.

6. A sodium sulphur battery as claimed in claim 5 and employing air as the heat transfer fluid wherein the means of passing said heat transfer fluid to said module comprises an air pump.

7. A sodium sulphur battery as claimed in claim 5 wherein heating means are provided for heating the heat transfer fluid.

8. A sodium sulphur battery as claimed in claim 6 in combination with a portable auxiliary air heater for feeding hot air into the battery modules.

9. A sodium sulphur battery as claimed in claim 5 wherein the flow control valve comprises an apertured element and closure element which are relatively movable under the control of said temperature-responsive means, whereby the aperture or apertures is or are closed or at least partially closed by the closure element within said predetermined temperature range and is or are open both above and below said predetermined temperature range.

10. A sodium sulphur battery as claimed in claim 9 wherein the temperature-responsive means is a bimetallic strip.

11. A sodium sulphur battery as claimed in claim 9 wherein the closure element and the aperture or apertures in said apertured element are arranged so that the valve is fully closed over a predetermined temperature range.

12. A sodium sulphur battery as claimed in claim 10 wherein the bimetallic strip is of helical form and is arranged to effect rotational movement between a closure member and an apertured plate.

13. A sodium sulphur battery as claimed in claim 5 wherein each module comprises a plurality of elongate cells arranged around a straight flow passage.

14. A sodium sulphur battery as claimed in claim 13 wherein said flow passage is formed by a metal tube in thermal contact with the cells.

15. A sodium sulphur battery as claimed in claim 13 wherein the flow control means is arranged at one end of the module.

16. A sodium sulphur battery as claimed in claim 5 wherein the modules are of square or rectangular cross-section.

* * * * *